Nov. 4, 1969  A. T. YOUNG  3,476,926
READING LIGHT FOR BED HEADBOARDS
Filed Aug. 25, 1967  2 Sheets-Sheet 1
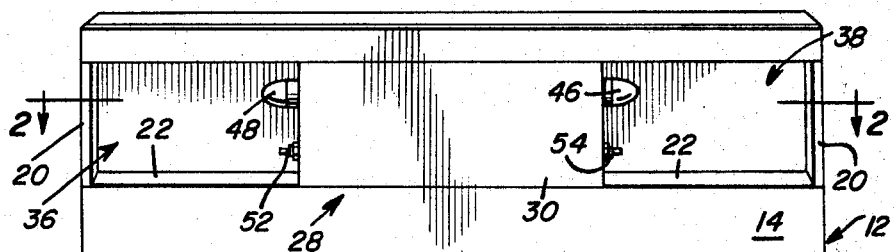
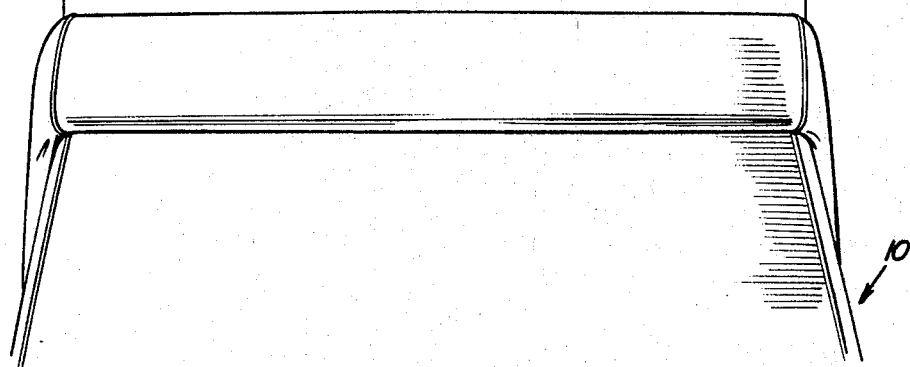
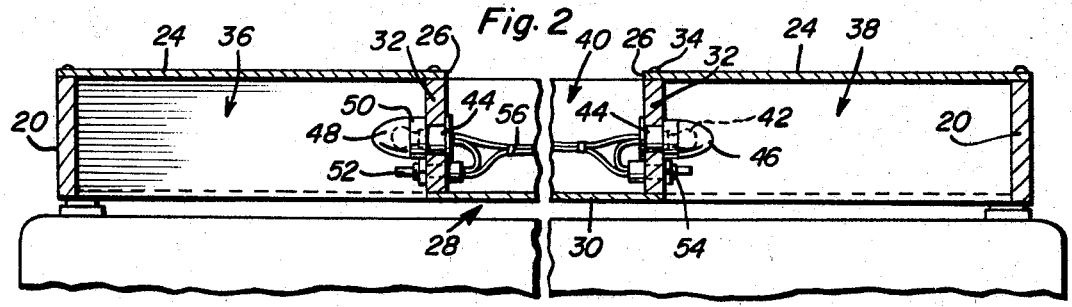
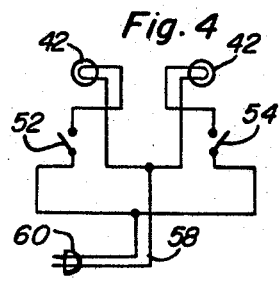
Alf T. Young
INVENTOR.

Nov. 4, 1969   A. T. YOUNG   3,476,926
READING LIGHT FOR BED HEADBOARDS
Filed Aug. 25, 1967   2 Sheets-Sheet 2
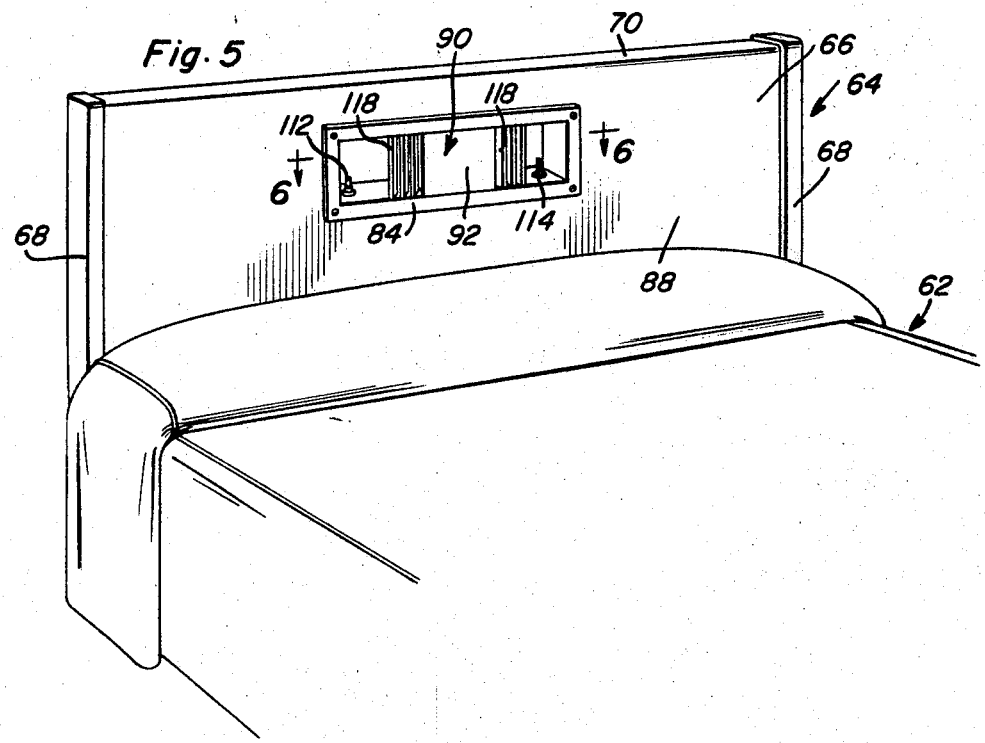
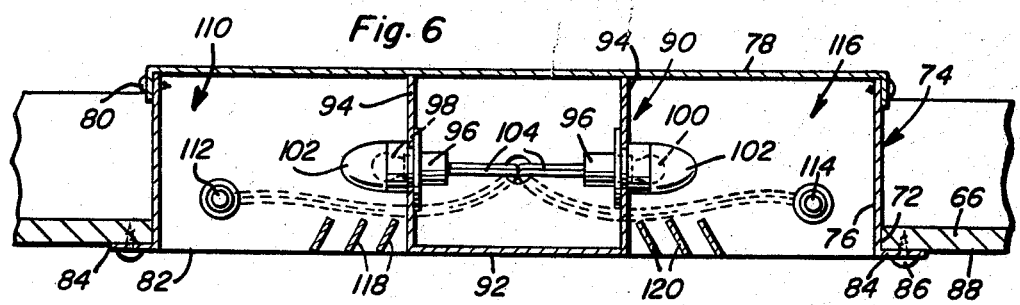
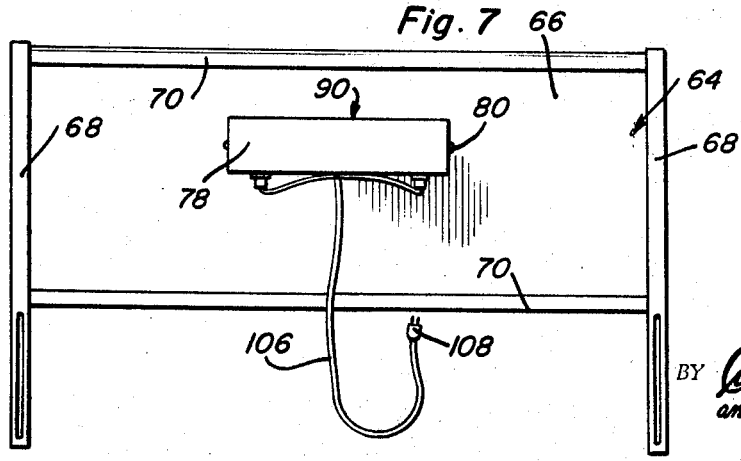
Alf T. Young
INVENTOR.

United States Patent Office 3,476,926
Patented Nov. 4, 1969

3,476,926
READING LIGHT FOR BED HEADBOARDS
Alf T. Young, Lakeview Drive, Box 85–D, Rte. 2,
Manchester, Tenn. 37355
Filed Aug. 25, 1967, Ser. No. 663,347
Int. Cl. F21v 33/00
U.S. Cl. 240—4
9 Claims

ABSTRACT OF THE DISCLOSURE

A headboard for a double bed having a built-in artificial source of light localized to focus the light rays. Individual switch-equipped lamps are isolated and spaced apart to allow the lamps to be used either individually or simultaneously. The headboard proper can be plain or constructed with self-contained book shelving compartments.

---

This invention relates to a headboard for a double bed which is unique in that the central upper marginal portion is provided with individual switch-equipped electrically energized separated lamps through the medium of which the light rays can be projected to comply with the needs of the individual occupants of the bed.

One headboard is plain and suitably apertured to accommodate a ready-to-install lamp box with louvers in front of individual switch-equipped electric lamps (bulbs or fluorescent tubes). The other headboard is a self-contained bookcase type and is equipped with spaced or isolated lamps which greatly contribute to its usefulness when employed on a double bed.

Briefly the concept, generically construed, has to do with the combination of a headboard for a bedstead, and a source of artificial light embodied in an upper marginal portion of said headboard, said source of light being localized in a position of use substantially midway between vertical marginal edge portions of said headboard and embodying at least two lamps, said lamps being spaced apart and isolated one from the other, means electrically wiring said lamps together for individaul or conjoint use, and a separate off and on switch for each lamp, each switch being selectively operable at will.

In carrying out the embodiment of the invention wherein a dual type lamp box is used the plain panel of the headboard is provided with a suitably centralized aperture or opening into which an open front flanged lamp box is fitted and fastened. A U-shaped adapter is fittingly mounted in the receptacle portion of the box and is constructed in a manner to transform the receptacle portion into left hand and right hand compartments so that the correspondingly left and right lamp bulbs are protectively confined in their cooperating compartments.

In the other embodiment of the invention the headboard is of the aforementioned bookcase type. In this situation the adapter, which may be of wood, if desired, is telescopingly fitted into the central portion and also divides the over-all receptable of the bookcase into similar compartments one to the left and one to the right and into which the respectively cooperating lamp bulbs project.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a front view in perspective showing a fragmentary portion of a double bed made up for use and, more particularly, the upstanding bookcase type headboard with the improved built-in source of light.

FIG. 2 is a section taken on the plane of the horizontal section line 2—2 of FIG. 1.

FIG. 3 is a rear perspective view of the headboard by itself.

FIG. 4 is a wiring diagram.

FIG. 5 is a view in perspective similar to FIG. 1 but at a different angle and which shows the plain headboard with the flanged built-in lamp box.

FIG. 6 is an enlarged view taken on the plane of the horizontal section line 6—6 of FIG. 5.

And FIG. 7 is a rear elevation of the headboard shown in FIG. 5 and which illustrates how the major part of the lamp box projects beyond the reverse surface of the headboard.

Inasmuch as there are two forms or embodiments of the invention shown it is to be pointed out here that FIGS. 1 to 4, inclusive, serve to exemplify one embodiment, that is, the bookcase type headboard with the added lighting facilities. On the other hand, FIGS. 5 to 7 serve to illustrate the alternate embodiment wherein the plain panel of the headboard is apertured to accommodate the inserted lamp box.

With reference now to FIGS. 1 to 3 in particular and more particularly to FIG. 1 the bed, which is conventional, is denoted by the numeral 10 and may be of any suitable construction. The bed shown is a so-called double bed and the headboard, referred to generally by the numeral 12 is commensurate in length and height to achieve the desired dual purpose result. The panel portion is denoted by the numeral 14 and is provided at its respective ends with appropriately constructed duplicate legs 16 (FIG. 3). The panel and legs function to support a bordering frame whose upper frame member is denoted at 18 and whose end vertical members are denoted at 20. The horizontal frame member 22 cooperates with the aforementioned frame members in providing an elongated shelf-type bookcase. The panels 24 are attached to the rear surfaces of the frame members and have their inner adjacent end portions 26 spaced apart to accommodate the prefabricated ready-to-install light source. This means is characterized by a substantially U-shaped unit which is here referred to as an adapter 28 and which may if desired be made of wood or other material (not detailed). The elongated wall is here referred to as a bight portion 30 and is connected at its respective ends to right angularly disposed complemental members which may be described here as end members or limbs 32. These component parts are fastened in place as denoted generaly at 34 in FIG. 2. When this substantially U-shaped adapter 28 is installed in the space of the overall bookcase it serves to divide or transform the same into a left hand pocket or compartment 36 (FIGS. 1 and 2) and a similar right hand pocket or compartment 38. As a matter of fact and because the adapter is open on the back as shown in FIG. 2 this, in a manner of speaking, provides a third compartment 40 which is accessible from the back, as is evident. The adapter 28 serves as a mounting for the isolated or separated lamps. These lamps may be of any appropriate construction depending upon the intensity of light (6 to 75 watts) that may be desired. As a matter of fact the lamps can be in the form of fluorescent tubes (not shown) or in the form of bulbs such as denoted at 42. To achieve the result desired the end members 32 are appropriately apertured to accommodate flanged fittings 44 having sockets into which the bulbs are screwed. The bulbs in each instance are protectively enclosed in bullet-shaped shades 46 which can be removably screw or otherwise mounted in place as denoted generally at 50. The illuminable lamp or bulb at the left in FIGS. 1 and 2 is provided with an appropriate off and on switch 52 and the lamp at the right is provided with a suitable companion switch 54. The lamps and switches are connected together for simultaneous as well as controlled operation by appropriate current conducting wires 56 which in turn are connected with a cord 58 (FIG. 3) having an appropriate plug 60 connected thereto. It follows that the respective pockets or compartments 36 and 38 are accordingly provided with individual switch controlled lamps which are so localized and arranged as to allow one occupant of a double bed to turn his lamp on to read while the other occupants whose lamp can be assumed to be off, can sleep without annoyance that might otherwise be encountered. It is believed that these several views FIGS. 1 to 3 can be considered in conjunction with the simple wiring diagram in FIG. 4 which is thought to be self-explanatory and need not therefore be described in detail.

With reference now to the modification appearing in FIGS. 5, 6 and 7 the double bed is here designated by the numeral 62. The headboard 64 comprises a flat surfaced or plain panel 66 having uprights or posts 68 at the respective ends and frame members 70 on the rear side as shown in FIG. 7. In this arrangement on opening of a suitable length is cut or otherwise formed in the upper median portion of the panel as denoted at 72 in FIG. 6. This opening serves to accommodate the prefabricated self-contained and ready-to-install light source or unit in the manner shown. This unit more specifically comprises a metal or an appropriate lamp box 74 which has a marginal rim or frame 76 and has a detachable back wall 78 fastened in place as at 80 and whose outer or forward face may be appropriately fashioned into a light reflector. The open front portion 82 of the box is provided with an outstanding flange 84 which is fastened in place at 86 on the obverse or front surface 88 of the panel. In this adaptation and arrangement left and right pockets or compartments are formed within the confines of the box by way of a centrally situated insert which is again referred to as a substantially U-shaped adapter 90 (FIG. 6). The adapter here comprises a bight portion 92 and end members or limbs 94 which abut the back wall 78 and are suitably secured thereto. The limbs or end members are provided with fittings 96 suitably flanged and provided with sockets to accommodate the left hand light bulb 98 and right hand lamp bulb 100 and also serve to support the bullet-shaped globes or shades 102. The wiring is here denoted generally at 104, the conductor at 106 (FIG. 7) and the plug at 108. The switch in the left hand compartment 110 is denoted at 112 and the switch in the right hand compartment (FIGS. 5 and 6) is denoted at 114, the compartment itself being conveniently designated at 116. The portions of the respective compartments adjacent the space dividing adapter 90 are provided with appropriately mounted and angled light-deflecting louvers denoted at the left as at 118 and at the right as at 120.

As is believed to be evident from the views of the drawings and description the light requirements can be limited, substantially so, to the side or half of the bed in keeping with the requirements of the individual occupants. The switches are conveniently located so that no difficulty should be encountered in switching the source of light on and off for individual reading and other needs.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a headboard for a bedstead, and a source of artificial light embodied in an upper marginal portion of said headboard, said source of light being localized in a position of use substantially midway between vertical marginal edge portions of said headboard and embodying at least two lamps, said lamps being spaced apart and isolated one from the other, means electrically wiring said lamps together for individual or conjoint use, and a separate off and on switch for each lamp, each switch being selectively operable at will.

2. The combination defined in and according to claim 1, and wherein the lamps are positioned in front of a coacting obverse surface of said headboard in a manner to focus the projected light rays forwardly from the focal points of the over-all light source.

3. The combination defined in and according to claim 2, and wherein said lamps and also said switches are recessed, that is, spaced rearwardly from other obverse surfaces so as not to jut objectionably beyond the environment of said surfaces.

4. The combination defined in and according to claim 3, and wherein said headboard is of a front elevational area to serve properly and capably at the head of a double bed, whereby to allow one occupant to turn his lamp on and read while allowing the other occupant, with his lamp off, to sleep without being annoyed by the lamp which is then on.

5. The combination defined in and according to claim 4, and wherein said headboard is characterized by a substantially flat panel having a horizontally elongated opening, an open-front lamp box fitted into and filling said opening and provided at its open side with a marginally encompassing flange abutting and secured to the obverse face of said panel, a U-shaped lamp basing and mounting adapter embodying a bight portion and complemental right angularly disposed limb portions, said limb portions fitting telescopingly into the receptacle part of said lamp box and said bight portion being in a plane flush with the plane of said flanges, one limb being spaced inwardly from a left end wall of said box, the other limb being spaced inwardly from the right end wall of said box and providing forwarding opening left and right compartments, and said lamps being mounted on their respectively cooperable limb portions within the encompassing confines of their cooperably associated compartments, and a switch in each compartment for the adjacent coacting lamp.

6. The combination defined in and according to claim 5, and wherein said lamp box embodies top and bottom walls and, in combination with said walls, louvers fixed between said walls to the left and right, respectively, of said adapter and bridging said lamps to deflect the light rays.

7. The combination according to claim 6, and wherein one lamp is situated within the confines of the compartment at the left and the other lamp is situated within the confines of the compartment to the right, said louvers being directly in front of their cooperative lamps, and the switches being housed but accessible for use in their oriented compartments.

8. For use at the head end of a double bed, a headboard embodying a leg supported vertical panel, the upper portion of said panel being fashioned into and providing a forwardly opening bookcase, an adapter fitted into a median portion of said bookcase and providing individual compartments one to the left and one to the right, said adapter being substantially U-shaped and embodying an elongated bight portion provided at its ends with laterally directed end members, each end member being provided with an electric lamp and a cooperating off and on switch, said lamps and switches being wired together for simultaneous as well as selective control and use.

9. The combination defined in and according to claim 8, and wherein said adapter provides a third compartment which is open at its rear to permit access to be had to the interior thereof.

References Cited

UNITED STATES PATENTS

| 2,418,877 | 4/1947 | Gustafson | 240—4 |
| 3,200,244 | 8/1965 | Meyer | 240—73 |
| 3,248,742 | 5/1966 | Johnson | 5—53 |

NORTON ANSHER, Primary Examiner

CHARLES E. SMITH, Assistant Examiner

U.S. Cl. X.R.

240—73